United States Patent

Moreau

[11] Patent Number: 5,919,287
[45] Date of Patent: Jul. 6, 1999

[54] PROCESS FOR THE PURIFICATION OF A SOLUTION OF LITHIUM SALTS CONTAMINATED BY METALLIC CATIONS AND USE OF THIS PROCESS IN THE PRODUCTION OF ZEOLITES EXCHANGED WITH LITHIUM

[75] Inventor: Serge Moreau, Velizy-Villacoublay, France

[73] Assignee: L'Air Liquide, Societe Anonyme pour l'Etude et l'Exploitation des Procedes Georges Claude, Paris Cedex, France

[21] Appl. No.: 08/775,243

[22] Filed: Dec. 30, 1996

[30] Foreign Application Priority Data

Jan. 18, 1996 [FR] France ................................ 96 00552

[51] Int. Cl.⁶ .................................................. B01D 53/02
[52] U.S. Cl. ............................ 95/130; 210/670; 210/681; 210/687; 502/64; 502/516
[58] Field of Search ..................... 210/670, 681, 210/682, 687, 688; 423/179.5, 181, 499.3; 95/130, 138; 502/64, 516

[56] References Cited

U.S. PATENT DOCUMENTS

| | | | |
|---|---|---|---|
| 4,855,059 | 8/1989 | Frianeza-Kullberg | 210/687 |
| 4,859,343 | 8/1989 | Frianeza-Kullberg et al. | 210/681 |
| 5,451,383 | 9/1995 | Leavitt | 210/681 |

FOREIGN PATENT DOCUMENTS

| | | |
|---|---|---|
| 0 659 481 | 6/1995 | European Pat. Off. . |
| 294 287 | 9/1991 | Germany . |
| 58-167424 | 10/1983 | Japan . |

*Primary Examiner*—Ivars Cintins
*Attorney, Agent, or Firm*—Young & Thompson

[57] ABSTRACT

A process for the purification of a solution of lithium salts contaminated by metallic cations, comprising (i) passing the solution to be purified through an exchange region packed with a material suitable for the exchange of $Li^+$ cations by contaminating metallic cations, this material being initially charged more than 95% with $Li^+$ cations and having a better affinity for the contaminating metallic cations than for $Li^+$ cations, so as to fix all of the contaminating metallic cations on the material by replacement of $Li^+$ cations, whereby the solution of lithium salts recovered at the outlet of the exchange zone is stripped of contaminating metallic cations; and (ii) regenerating the material by replacement of the metallic cations fixed on the material with $Li^+$ cations.

17 Claims, No Drawings

5,919,287

PROCESS FOR THE PURIFICATION OF A SOLUTION OF LITHIUM SALTS CONTAMINATED BY METALLIC CATIONS AND USE OF THIS PROCESS IN THE PRODUCTION OF ZEOLITES EXCHANGED WITH LITHIUM

CROSS-REFERENCE TO RELATED APPLICATION

This application corresponds to French application 96 00552 of Jan. 18, 1996, the disclosure of which is incorporated herein by reference.

FIELD OF THE INVENTION

The invention relates to a process for the purification of solutions of lithium salts contaminated by metallic cations, in which the metallic impurities are eliminated by ion exchange by contact of said solutions with a suitable material. The process of the invention is particularly useful for recycling residual solutions from production units of lithium zeolites.

BACKGROUND OF THE INVENTION

Among the adsorbents permitting good separation of nitrogen and oxygen contained in air, lithium zeolites and particularly lithium faujasites are particularly efficacious by reason of their increased selectivity of the adsorption of nitrogen relative to oxygen.

The principal drawback of these zeolites is nevertheless their very high cost.

In the prior art, lithium faujasites are prepared by ion exchange with synthetic sodium faujasites, which are available commercially.

More particularly, the methods described foresee the treatment of sodium faujasites by solutions of lithium salts. However, to the extent that faujasites, like most zeolites, have a better affinity for $Na^+$ ions than for $Li^+$ ions, a large part of the sodium salts solutions must be poured over the faujasite so as to produce a faujasite exchanged with at least 80% lithium. On the average, the consumption of lithium ions corresponds to 4 to 12 times the quantity of lithium ions to be incorporated in the faujasite. However, the lithium salts used, principally chlorides, are cumbersome and pollutant: these major drawbacks have until now limited the development and use of lithium zeolites.

So as to overcome these drawbacks, the use of recycling techniques for the residual solutions of lithium salts from lithium zeolite production units would be desirable.

SUMMARY OF THE INVENTION

To do this, the invention provides a process for the treatment of solutions of lithium salts contaminated with metallic cations, permitting complete elimination of the metallic impurities. This process is well adapted for the purification of residual solutions of lithium salts from lithium zeolite production units to the extent that these residual solutions contain as their principal impurities metallic cations initially contained in the starting natural or synthetic zeolite.

In greater detail, the invention provides a process for the purification of a solution of lithium salts contaminated with metallic cations, comprising the steps consisting of:

(i) passing the solution to be purified through an exchange region packed with a suitable material for the exchange of $Li^+$ cations with said metallic cations, said material being initially loaded with more than 95% of $Li^+$ cations and having a better affinity for said metallic cations than for the $Li^+$ cations, so as to fix all of the contaminating metallic cations on said material by replacement of $Li^+$ cations, whereby the solution of lithium salts recovered at the outlet of said exchange region is stripped of said contaminating metallic cations;

(ii) regenerating said material by replacement of the metallic cations fixed on said material with $Li^+$ cations.

DETAILED DESCRIPTION OF THE INVENTION

The process of the invention is applicable whether the contaminating metallic cations are mono-, di- or trivalent. According to the invention, there is understood by mono- or di- or respectively trivalent cation, the cations respectively having the oxidation state +I, +II and +III. Thus, the solutions to be purified can be polluted by any of the alkali metal cations, alkaline-earth metals, transition metals or lanthanides such as the $Na^+$ and $Ca^{2+}$ cations. Similarly, the process of the invention can be used for the purification of solutions of lithium salts comprising more than one contaminating metallic cation.

The nature of the lithium salts is likewise non-determinant. According to a preferred embodiment, the solution of lithium salts to be purified is an aqueous solution of lithium chloride. More generally, the lithium salts can be sulfates, nitrates or halides.

The process of the invention can be used no matter what the concentration of metallic cations in the solution to be purified. However, so as to limit the size of the purification installations, it is preferable that the metallic impurities be less in quantity than a maximum value. More particularly, when said solution to be purified contains i separate metallic cations, it is preferred that the respective molar concentrations $c_i$ of each of said metallic cations respond to the relationship:

$$\Sigma_i \frac{n_i \cdot c_i}{c_{Li}} \leq 0.9$$

in which $n_i$ is the oxidation state of the metallic cation i and $c_{Li}$ is the molar concentration of $Li^+$ cations in the solution to be purified.

Thus, a particularly preferred embodiment of the invention consists in purifying a solution of lithium chloride comprising as impurity sodium chloride, in which the molar ratio of the $Na^+$ cations to the $Li^+$ cations is at most 9.

The material suitable for exchanging $Li^+$ cations with metallic cations contaminating the solution to be purified, is initially, that is, at the beginning of treatment, principally charged with $Li^+$ ions. In the course of treatment and more particularly in step (i) described above, said material captures the metallic cations from the solution to be purified and returns to the residual solution, recovered at the outlet of the exchange zone, lithium cations. To the extent said material is selected such that its affinity for metallic ions to be eliminated is greater than its affinity for lithium, the exchange processes taking place in step (i) are thermodynamically favored. Thus, if the material used is sufficiently charged with lithium cations, the residual solution recovered at the outlet will be entirely stripped of the contaminating metallic cations. By trial and error, it has been determined that such will be effectively the case when said material is loaded with more than 95% lithium, which means generally that 95% of the exchangeable metallic cations associated with said material are lithium cations. As suitable material for exchanging $Li^+$ cations with metallic cations, can be used zeolites or cation exchange resins.

As cation exchange resins, can be cited carboxylic or sulfonic resins. The particular nature of the resin used is however not essential according to the invention, provided it permits the exchange of cations and that its affinity for $Li^+$ cations is less than its affinity for the metallic cations to be eliminated.

Amberlite resins fulfilling these various characteristics are particularly available from the company Rohm & Haas, namely under the designations IRC 86, HP 333, HP 336, 1200 H, and 1500 H.

It should be remembered nevertheless that according to the invention the ion exchange resin used as starting material is loaded with 95% lithium.

Such resins are either commercial or easily prepared by specialists from commercial resins in sodium or ammonium form by conventional ion exchange processes.

According to the ion exchange resin selected, one skilled in the art will adjust the precise operative conditions of the process of the invention according to the manufacturer's recommendations and on the basis of his or her own knowledge of the art.

The zeolites usable according to the invention belong to the group of natural or synthetic hydrated metallic aluminosilicates. These differ from each other by their chemical composition, their crystalline structure and their physical properties, such as their x-ray diffraction diagram.

Generally speaking, the zeolite crystals are constituted by interlocked tetrahedral networks of $SiO_4$ and $AlO_4$, each oxygen atom forming a part of a $SiO_4$ network and an $AlO_4$ network such that the ratio of the oxygen atoms to the silicon and aluminum atoms is 2. A certain number of cations, for example alkali metal or alkaline-earth cations such as sodium, potassium, calcium and magnesium, included in the crystalline network, ensure the electrical neutrality of the zeolite.

According to the invention, the zeolites can be in the form of crystalline powders or agglomerates. The zeolite agglomerates are obtained in a conventional manner by use of conventional agglomeration processes.

The agglomerated zeolite can for example be prepared by mixing a crystalline powder of zeolite with water and a binder (generally in the form of a powder), then pulverizing this mixture with zeolite agglomerates performing the function of agglomeration centers. During pulverization, the zeolite agglomerates are subjected to continuous rotation on themselves. This can be brought about by arranging the agglomerates in a reactor that rotates about its axis of rotation, said axis of rotation being preferably inclined relative to the vertical. By this process, currently called a "snowball" technique in the art, there are obtained agglomerates in the form of balls.

The agglomerates thus obtained are then subjected to heating at a temperature comprised between about 500 and 700° C., preferably a temperature of about 600° C.

As an example of binder, those skilled in the art could use a clay such as kaolin, silica or alumina.

The agglomerated zeolite thus obtained, which comprises a binder, can serve for the preparation of agglomerated zeolite without a binder also usable in the process of the invention. So as to convert the binder in zeolitic phase, one can proceed in effect to the final cooking of the zeolitic agglomerates with a binder, whereby, after crystallization, there are obtained zeolitic agglomerates without a binder.

According to a preferred embodiment of the invention, the zeolite must be stable, in its acid form, at a temperature comprised between 150 and 350° C., whilst having a Si/Al ratio less than 5.

In this case, the regeneration of the zeolite at the end of step (i) is facilitated.

Within the scope of the invention are included zeolites in acid form, a zeolite of which all or a portion of the metallic cations has been replaced by H+cations.

Among these zeolites, those having the best affinity for the ammonium cation, $NH_4^+$, than for the contaminating metallic cations, are more particularly preferred.

Moreover, preferably the zeolite used has an exchange capacity greater than 1.5 eq/kg, preferably greater than 5 eq/kg, a Si/Al ratio comprised between 1 and 2, and a pore diameter greater than 4 Å. The expression "exchange capacity greater than 1.5 eq/kg" means that one kilogram of zeolite can trap up to 1.5 equivalents of metallic ions, which is to say Z moles of metallic cations, in which Z is given by the equation:

$$Z = \frac{1.5}{n_i}$$

wherein $n_i$ is the oxidation state of the metal.

For the preparation of such zeolites, one skilled in the art can have recourse to any one of the exchange processes known in the art. By way of illustration, the following operative protocol, for the preparation of lithium faujasite, is given:

through a column packed with faujasite, maintained at a temperature between 70 and 95° C., an aqueous solution of lithium salts is percolated, such as an aqueous solution of lithium chloride, whose pH has been adjusted to between 8 and 10 by the addition of lithium hydroxide. This operation is continued for a time sufficient to exchange at least 90% of the cations of the zeolite. It is generally considered that to introduce a given quantity of lithium ions into the zeolite, it is necessary to elute the column with 4 to 12 times this quantity of lithium ions. One can thus easily determine the volume of the solution of lithium salts which must be poured into the head of the column, given its normality. Preferably, there will be used an aqueous solution of lithium chloride whose normality is comprised between 0.5 and 1.5N, preferably an aqueous solution of about 1N lithium chloride. Preferably, the temperature of the zeolite will be maintained at 95° C., as well as the lithium chloride solution, during all the duration of the ion exchange.

According to a preferred modification of the invention, the material suitable for $Li^+$ cation exchange with contaminating metallic cations, is a zeolite selected from among erionite, chabazite, offretite, clinoptilolite and mordenite, these zeolites being exchanged with at least 95% lithium.

The preferred operating conditions for step (i) of the process of the invention are atmospheric pressure and a temperature comprised between 5 and 30° C., preferably between 5 and 15° C.

The process for regeneration of the material that is suitable for the exchange ($Li^+\leftarrow\rightarrow$metallic cations) used in step (ii) depends on the nature of said material.

When it is a cation exchange resin, the regeneration of said material comprises:

a) the treatment of the cation exchange resin with a solution of a strong mineral acid such as nitric acid, sulfuric acid or hydrochloric acid, whereby the cation exchange resin is converted to its acid form; and b) the final treatment of the cation exchange resin resulting from step a) above with an aqueous solution of lithium hydroxide, whereby the resin is thus regenerated.

During the first step of the regeneration process (step a)), it is preferred to maintain the temperature between 5 and 95° C., preferably between 20 and 60° C.

Generally speaking, it will be noted that by controlling carefully the temperature, the exchange process can be facilitated. More particularly, when the exchange is favorable, which is to say that the zeolite has a better affinity for the cations in solution than for the cations within its macroporous network, it is preferable to operate at low temperature. On the contrary, when exchange is unfavorable, it is desirable to raise the temperature. As a matter of fact, any elevation of the temperature tends to render uniform the distribution of the species of ions between the zeolitic phase and the liquid phase.

Preferably, the normality of the solution of strong mineral acid, which is for example an aqueous solution, is comprised between 0.1 and 10N, more preferably between 0.1 and 5N.

It will be clear that the quantity of strong acid necessary for the conversion of the cation exchange resin to acid resin is easily determinable by one skilled in the art. Given the low cost of the mineral acid used, an excess of acid corresponding to 2.5 times stoichiometric could be used.

As to the operating conditions for step b) of said regeneration process, it will be noted that a temperature between 5 and 95° C., preferably between 5 and 40° C., is more particularly recommended, the pH of the aqueous solution, being preferably maintained between 8 and 11, more particularly between 8 and 10. In step b), a pressure adjacent atmospheric pressure is satisfactory.

The reaction carried out in this step is complete: it is thus an acid-base reaction. Because of this, the quantity of lithium hydroxide to be used corresponds preferably to 1 to 1.2 times the stoichiometric quantity.

When the material suitable for exchanging $Li^+$ cations with contaminating metallic cations is a zeolite, the regeneration process foreseen by the inventors is quite different. The steps involved in said process are thus:

a) a first step of treatment of the zeolite with a content of $NH_4^+$ cations, whereby all of the metallic cations fixed on the zeolite are replaced by $NH_4^+$ cations;

b) a second step of heating the zeolite from the preceding step, to a temperature comprised between 150 and 350° C., whereby the zeolite is converted to its acid form with the release of ammonia; and c) a final treatment step of the zeolite in acid form, resulting from step b) above, with an aqueous solution of lithium hydroxide, whereby said zeolite is regenerated.

In step a) above, it is preferable to operate at a temperature comprised between 5 and 95° C., preferably between 5 and 60° C., more preferably between 20 and 40° C.

The solution containing $NH_4^+$ cations, which is preferably an aqueous solution, preferably has a normality comprised between 0.1 and 10N, more preferably between 0.1 and 5N.

This solution is for example an aqueous solution of ammonium sulfate or ammonium chloride.

According to one preferred embodiment of the invention, the disammoniation practiced in step b) is carried out by heating the zeolite to a temperature between 150 and 350° C., whilst maintaining the zeolite under a current of inert gas such as air, argon or nitrogen.

It will be noted that, according to the invention, by "inert gas" is intended a gas which does not react with ammonia nor with the zeolite, whether the latter is in its acid form or charged with $NH_4^+$ cations.

Preferably, the gaseous ammonia given off by the zeolite in step b) is recycled to step a) after bubbling through a solution of suitable acid. For example, if in step a) the solution containing $NH_4^+$ cations is an aqueous solution of ammonium sulfate, in step b) the recycling of the ammonia that is formed will be carried out by bubbling this through an aqueous solution of sulfuric acid.

To the extent that the zeolite used as suitable material for the exchange ($Li^+\leftarrow\rightarrow$metallic cations) has a better affinity for $NH_4^+$ cations than for contaminating metallic cations, the quantity of $NH_4^+$ cations must be percolated in step a) through the zeolite to be regenerated is near the quantity of metallic ions to be displaced. Thus, the exchange of all the metallic cations fixed on said zeolite will be carried out by elution of a solution containing 1 to 1.5 times stoichiometric in $NH_4^+$ ions.

As to step c), the treatment with lithium hydroxide, there will preferably be used an aqueous solution of lithium hydroxide having a pH between 8 and 11, preferably between 8 and 10, whilst maintaining the temperature at a value between 5 and 95° C., preferably between 5 and 40° C., given that a pressure near atmospheric pressure is quite suitable. This treatment step c) is otherwise similar to step b) practiced in the case of regeneration of cation exchange resins described above.

The process of the invention is especially adapted for recycling residual solutions from lithium zeolite production units.

Thus, the invention also relates to a process for the production of a zeolite exchanged with lithium from a zeolite which at the outset contains one or several metallic cations other than lithium, comprising the steps consisting in:

(α) passing through a first exchange zone packed with said starting zeolite and maintained at a temperature between 50 and 150° C., a solution of lithium salts for the time necessary to exchange the metallic cations of said starting zeolite with $Li^+$ cations, and recovering, at the outlet of said exchange zone, the base residual solution of lithium salts and containing the displaced metallic cations, from said starting zeolite; and (β) purifying the residual solution recovered at the outlet of said first exchange zone by practice of the purification process of the invention comprising the steps consisting in:

—passing the solution to be purified through a second exchange zone packed with a suitable material for exchanging $Li^+$ cations with said metallic cations, said material being initially loaded with more than 95° $Li^+$ cations and having a better affinity for said metallic cations than for the $Li^+$ cations so as to fix all the contaminating metallic cations on said material by displacement of the $Li^+$ cations, whereby the solution of lithium salts recovered at the outlet of said second exchange zone is stripped of said contaminating metallic cations;

—regenerating said material by replacement of the metallic cations fixed on said material with $Li^+$ cations.

As the lithium salt solution, it is preferred to use in step (α) an aqueous solution of lithium chloride.

According to a preferred embodiment, said first exchange zone is maintained throughout step (α) at a temperature between 70 and 95° C. and at atmospheric pressure.

According to the invention, there can be provided for, by this process, the preparation of any type of zeolite exchanged with lithium. The process of the invention is particularly suitable for the production of lithium faujasites.

It will be noted that the residual solutions from the lithium zeolite production units are often basic aqueous solutions: thus, in the course of production, the pH of the elution solutions is adjusted between 8 and 10 by addition of small quantities of lithium hydroxide.

It has been noted that the presence of lithium hydroxide in the basicity of the solutions to be purified in no way hinders the effectiveness of the purification process of the invention.

According to the invention, the nature of the exchange zone is not definitive. The latter can be a column or a reactor such as a vat. So as to limit the consumption of reagents and to facilitate handling, an exchange zone in the form of a column is preferred, which is packed with agglomerated zeolite. Nevertheless, in the case of the reaction of lithium hydroxide with zeolite or the cation exchange resin in acid form, there will preferably be used a vat process, the reaction being stoichiometric.

The process of the invention can advantageously be used in a PSA/VSA-$O_2$ process and more particularly in a process for the separation of a mixture of oxygen and nitrogen into each of its constituents, comprising contacting the mixture to be separated with an adsorbent selective to nitrogen, as this implies the use of a zeolite exchanged with lithium.

The invention will now be described with reference to the following example given only by way of a sample.

EXAMPLE

This example shows the purification of residual solutions from a production unit of lithium faujasite.

A—Preparation of a faujasite exchanged with 95% lithium.

The faujasite used as starting material is available from the company UOP under the trade name 13X-APG. It is an agglomerated zeolite, in granulated form, containing about 20% binder, having a Si/Al ratio of 1.25, an exchange capacity of 5.1 eq/kg. This zeolite contains only $Na^+$ cations.

After having placed 1 kg of this faujasite in a column maintained at 95° C., there is percolated through the column 12.2 liters of an aqueous 2N solution of lithium chloride whose pH has first been adjusted to 8 by addition of a small quantity of lithium hydroxide. The residual solution recovered at the outlet of the column packed with zeolite comprises 20 mole % of sodium chloride and 80 mole % of lithium chloride.

B—Purification of the residual solution recovered from step A.

The material used for the purification of the residual solution recovered from step A is a chabazite powder having an exchange capacity of 2 eq/kg.

This powder is simply obtained by practice of the steps of:
(i) mixing 60.6 g of aluminum hydroxide, 54.56 g of sodium hydroxide, 35.0 g of potassium hydroxide, 4.48 g of tetrabutyl-ammonium hydroxide, 420.8 g of silica (Ludox HS 30) and 269 g of water; and
(ii) heating to 95° C. for one day in a sealed polypropylene reactor.

In the first instance, 2.45 kg of this chabazite is converted to chabazite exchanged 100% with lithium. To do this, there is used the following operative procedure: through a column packed with 2.45 kg of commercial chabazite maintained at 95° C., there is percolated an aqueous 2N solution of lithium chloride, until no trace of sodium is detected at the outlet of the column. To improve the exchange kinetics, the pH of the lithium chloride elution solution is first adjusted to 8 by addition of a small quantity of lithium hydroxide.

After rinsing with water the chabazite thus obtained, which has been exchanged to 100% lithium, the residual solution recovered in step A is passed through the lithium chabazite column.

The solution recovered at the outlet of the column is a solution of lithium chloride containing no trace of sodium chloride.

C—Regeneration of the chabazite used in step B.

So as to regenerate the chabazite in the form $Li^+$, there is carried out the following sequence of operations:

1—There is percolated through the column packed with 2.45 kg of chabazite, maintained at ambient temperature, 4.9 liters of a 1N solution of ammonium sulfate. In this way, all the $Na^+$ cations of the chabazite are displaced by $NH_4^+$ cations.

2—The chabazite is brought to 200° C. by passing a current of nitrogen continuously through the column so as to entrain the ammonia given off by the chabazite. The column is maintained at this temperature so long as ammonia is detected at the outlet of the column.

3—The column is then emptied of its contents and the chabazite introduced into a reaction vat maintained at ambient temperature. Into this vat are introduced with stirring 48.5 liters of a 0.1N solution of lithium hydroxide. At the end of this step, the chabazite is totally in the form $Li^+$.

What is claimed is:

1. Process for the purification of a solution of lithium salts contaminated by metallic cations other than lithium, comprising the steps of:
   (i) passing a solution to be purified through an exchange zone packed with a zeolite adapted to exchange $Li^+$ cations with said metallic cations other than lithium, said zeolite being initially loaded with more than 95% $Li^+$ cations and having a better affinity for said metallic cations other than lithium than for the $Li^+$ cations, so as to fix all the contaminating metallic cations on said zeolite by displacement of $Li^+$ cations, whereby the solution of lithium salts recovered at the outlet of said exchange zone is stripped of said contaminating metallic cations; and
   (ii) regenerating said zeolite by replacing the contaminating metallic cations fixed on said zeolite with $Li^+$ cations, by:
      a) contacting the zeolite with a solution containing $NH_4^+$ cations, whereby all of the metallic cations fixed on said zeolite are displaced by $NH_4^+$ cations;
      b) heating the zeolite from previous step a) to a temperature between 150 and 350° C., whereby said zeolite is converted to its acid form giving off ammonia; and
      c) contacting the zeolite in its acid form, resulting from step b) above, with an aqueous solution of lithium hydroxide, whereby said zeolite is thus regenerated.

2. Process according to claim 1, wherein said contaminating metallic cations are mono-, di- or trivalent cations or a mixture thereof selected from the group consisting of cations of alkali metals, alkaline-earth metals, transition metals and lanthanides.

3. Process according to claim 1, wherein said contaminating metallic cations are selected from the group consisting of $Na^+$, $Ca^{2+}$ and a mixture thereof.

4. Process according to claim 1, wherein the solution of lithium salts to be purified is an aqueous solution of lithium chloride.

5. Process according to claim 1, wherein said solution of lithium salts to be purified comprises contaminating metallic cations in proportions such that the respective molar concentrations $c_i$ of said contaminating cations satisfy the equation:

$$\Sigma_i \frac{n_i \cdot c_i}{c_{Li}} \leq 0.9$$

in which $n_i$ represents the oxidation state of the contaminating metallic cation i and $c_{Li}$ represents the molar concentration of $Li^+$ cations of said solution to be purified.

6. Process according to claim 1, wherein the solution of lithium salts to be purified is a solution of lithium chloride comprising as impurities sodium chloride in which the molar ratio of the $Na^+$ cations to the $Li^+$ cations is at most 9.

7. Process according to claim 1, wherein the zeolite in its acid form is stable at a temperature between 150 and 350° C. and the zeolite has a Si/Al ratio less than 5.

8. Process according to claim 1, wherein the zeolite has a better affinity for ammonium cations, than for the contaminating metallic cations.

9. Process according to claim 1, wherein said zeolite is selected from the group consisting of mordenite, chabazite, clinoptilolite, offretite and erionite.

10. Process according to claim 1, wherein in step (i) the temperature is maintained between 5 and 30° C.

11. Process according to claim 1, wherein the zeolite has an ion exchange capacity greater than 1.5 eq/kg, a Si/Al ratio comprised between 1 and 2 and a pore diameter greater than 4 Å.

12. Process according to claim 1, wherein in step (a) the temperature is maintained between 5 and 95° C., and the solution containing $NH_4^+$ cations is an aqueous solution of normality between 0.1 and 10N.

13. Process according to claim 1, wherein in step (a) there is used an aqueous solution of ammonium sulfate or chloride of a normality between 0.1 and 10N, the temperature being maintained between 5 and 95° C.

14. Process according to claim 1, wherein the aqueous solution of lithium hydroxide has a pH between 8 and 11, and a temperature maintained between 5 and 95° C.

15. Process for the production of a zeolite exchanged with lithium from a starting zeolite containing metallic cations other than lithium, comprising the steps of:

(α) passing through an exchange zone packed with said starting zeolite and maintained at a temperature comprised between 50 and 150° C., a solution of lithium salts for a time necessary for exchanging metallic cations of said starting zeolite with $Li^+$ cations, and recovering at the outlet of said exchange zone a residual solution of lithium salts and containing metallic cations displaced from said starting zeolite; and (β) purifying the residual solution recovered at the outlet of said exchange zone by carrying out the steps of claim 1, and recycling to step (α) the purified residual solution.

16. Process according to claim 15, wherein the solution of lithium salts is an aqueous solution of lithium chloride.

17. Process for the separation of a mixture of oxygen and nitrogen into each of its components, comprising contacting the mixture to be separated with a zeolite exchanged with lithium produced by carrying out the steps of claim 15.

* * * * *